No. 897,230. PATENTED AUG. 25, 1908.
T. L. & T. J. STURTEVANT.
MOTOR VEHICLE.
APPLICATION FILED SEPT. 3, 1904.

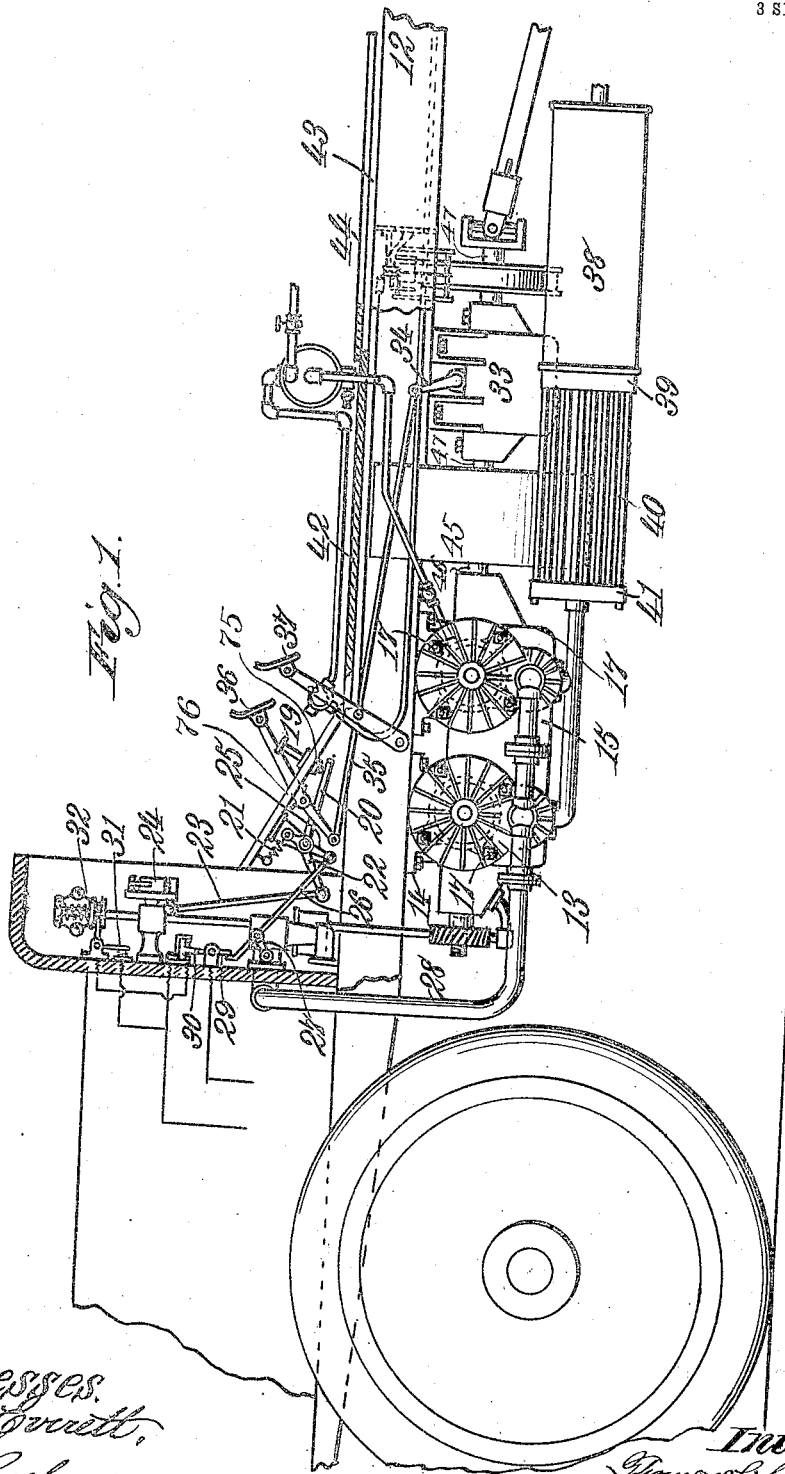

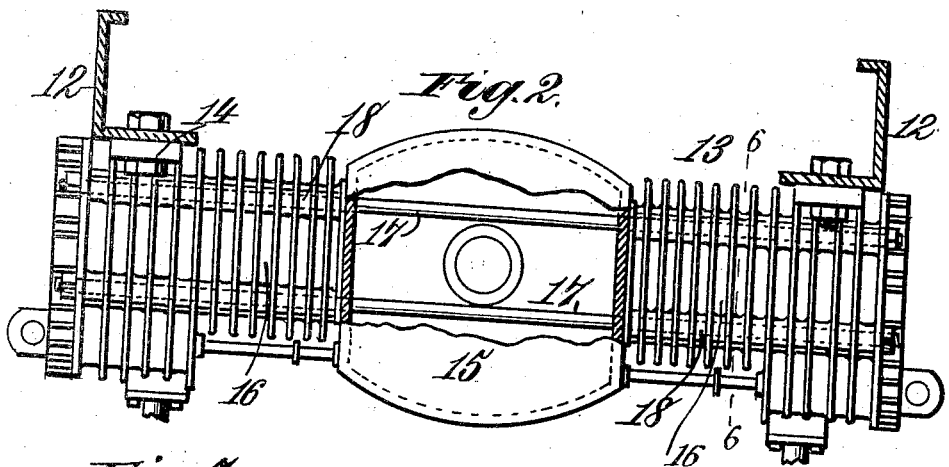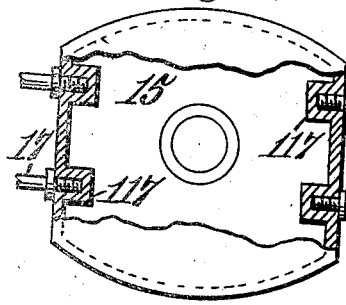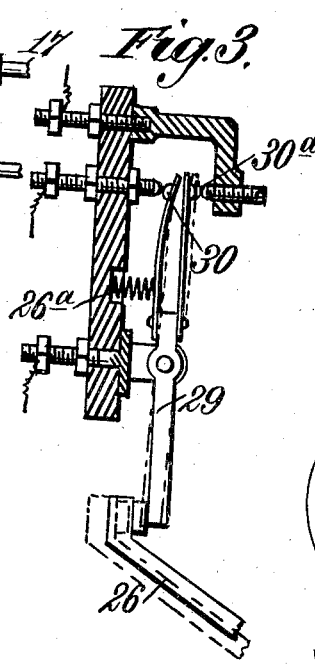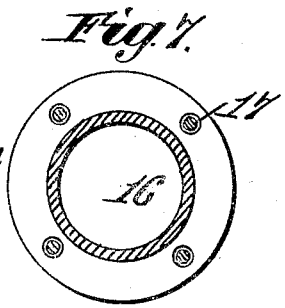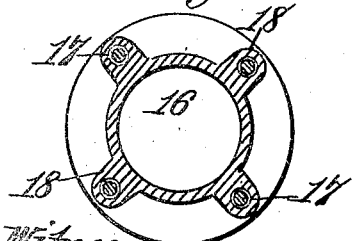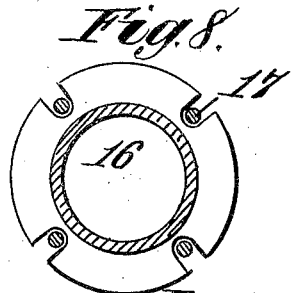

3 SHEETS—SHEET 3.

Witnesses:
Inventors:
Thomas L. Sturtevant,
Thomas J. Sturtevant,

UNITED STATES PATENT OFFICE.

THOMAS LEGGETT STURTEVANT, OF QUINCY, AND THOMAS JOSEPH STURTEVANT, OF WELLESLEY, MASSACHUSETTS.

MOTOR-VEHICLE.

No. 897,230.　　　Specification of Letters Patent.　　　Patented Aug. 25, 1908.

Application filed September 3, 1904. Serial No. 223,247.

*To all whom it may concern:*

Be it known that we, THOMAS LEGGETT STURTEVANT and THOMAS JOSEPH STURTEVANT, both citizens of the United States, residing, respectively, at Quincy and at Wellesley, in the county of Norfolk and State of Massachusetts, have invented certain new and useful Improvements in Motor-Vehicles, of which the following is a specification, reference being had therein to the accompanying drawings.

The present invention relates to motor vehicles and is designed especially for motor cars or automobiles, in connection with which type of vehicle the invention will be illustrated and described, but it will be understood that in many of its features it is applicable to other types of vehicles, such as motor-boats; and in fact may be used in connection with any high-speed motor of the explosion type.

The object of the invention is to provide a simple and efficient mechanism for the control of the motive power, and to effect a reduction of the number of levers and pedals necessary for the management of the car; this being an important thing in motor car construction; and, as will hereinafter appear, this problem has been solved by providing a construction in which a single controlling lever or element serves to take care of the carbureting devices and the sparking instrumentalities, so that they will work in perfect harmony at all times and be under the immediate control of the operator; and as a result, the motor, the clutch devices, and the driving mechanisms are at all times under the control of the operator through a single part or element.

Figure 4:
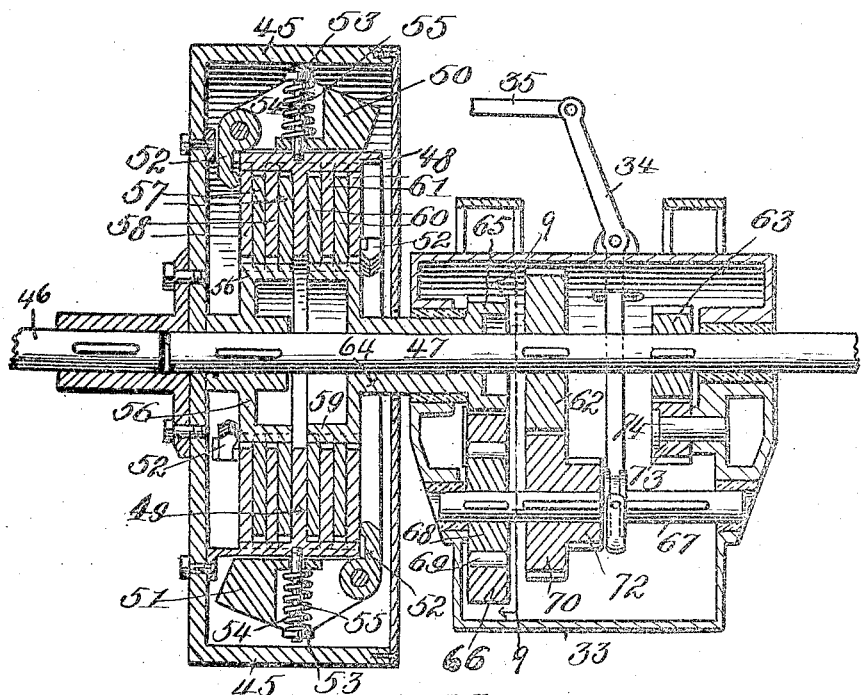
Figure 9:
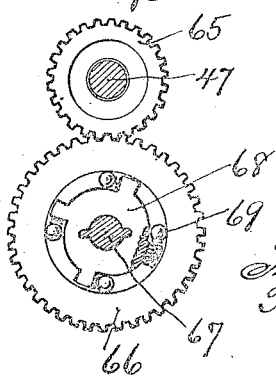

Referring to the drawings, Figure 1 is a side elevation of so much of a chassis as will serve to illustrate the invention, parts of the construction being in section for clearness of illustration. Fig. 2 is a view of the crank-case and the removable cylinders to show the novel manner of assembling these parts with relation to each other and the chassis frame. Fig. 3 is an enlarged detail view of the control mechanism for the sparking circuit. Fig. 4 is a sectional view to show the clutch and gearing devices. Fig. 5 is a detail view to show a modified construction for attaching the cylinder-securing through-bolts to the crank-case. Fig. 6 is a sectional view of a cylinder on line 6—6 of Fig. 2. Figs. 7 and 8 are transverse sectional views of cylinders showing slightly modified constructions for mounting the through-bolts for securing the cylinders to the crank-case. Fig. 9 is a detail sectional view on line 9—9, Fig. 4.

Referring to the drawings, 12 indicates the chassis or frame of the car, from the under-side of which frame the motor 13 is hung by means of suitable supports 14 bolted to the lower horizontal webs of the side-beams of the chassis, as seen in Fig. 2. This crosswise arrangement of the motor has the advantage of giving great rigidity to the chassis; the motor frame being, in effect, a transverse brace beam joining the chassis side-beams; and furthermore since the cylinders are in direct heat-conducting contact with the said side beams, the heat of the cylinders is effectively dissipated by the chassis. The motor, which, in the present instance, is shown as of the horizontal, opposed-cylinder type, has the inclosed crank-case 15, to the opposite side of which the motor cylinders 16 are detachably secured. Said cylinders 16 are held to the crank-case by means of long tension members or through-bolts 17 which extend from the outsides of the heads of the cylinders 16 through orifices or side recesses in lugs 18 on the outside of the cylinders 16 (see Figs. 2 and 6). The said bolts 17 may extend through the crank-case as shown in Fig. 2, or they may enter lugs 117 cast in each side of the crank-case, as shown in Fig. 5. Instead of forming the orifices or recesses in lugs formed on the cylinders, as shown in Figs. 2 and 6, these cylinder lugs may be omitted, if desired, and the through-bolts 17 may pass through and be seated either in holes (see Fig. 7) or notches (see Fig. 8) formed in the circumferential ribs of the cylinders, any one of the modifications shown and described affording a strong, rigid construction. It will be seen that said bolts 17 add great rigidity to the framing of the car, and since they are so placed with respect to the cylinders that they are subjected throughout their entire length to the same degree of temperature, no difficulty or breakage arises because of unequal expansion and contraction of the parts. The cylinders 16 carry the exhaust and inlet valve, as shown, (see Figs. 1 and 2) so that the cylinders when removed carry all their associated parts with them. It will be apparent that with this construction a mechanic may readily remove any one of the cylinders for inspection or repair by merely loosening and withdrawing the tie-bolts 17 which connect the cylinder to the crank-case, after which the cylinder hangers by which the cylinders are secured to the side-beams of the chassis may be loosened and the cylinders taken out. This construction does away with the hardship and difficulty of working beneath the car in order to remove the engine cylinders and parts.

Referring now to the controlling mechanism which we have devised, it may here be stated that this controlling mechanism is designed to be used in connection with the clutch device shown and described in our Patent No. 766,551, dated August 2, 1904, although not necessarily confined to the clutch-device or power-transmitting mechanism of that particular type, being adaptable to any good centrifugally operated clutch. The controlling mechanism comprises a manually controlled element or part, such as the push-pin 19, which is mounted in a suitable aperture in the inclined forward part 76 of the floor of the machine. At its lower end said push-pin engages a lever 20, mounted in suitable hangers beneath the floor of the car, said lever having a spring 21 which normally holds it in the inactive position shown in Fig. 1. Said lever 20 is provided with an arm 22 which is connected by a suitable link 23 with the spark-timer or commutator 24 of ordinary construction, so that the said commutator will be under the control of the operator, and through the push-pin, lever, and link connections just described, enable him to advance the spark by giving a partial rotation to the said commutator 24. The said push-pin 19 is provided beneath the inclined floor part 76 with a collar or nut 75 which, under the stress of the spring 21, is caused to abut against the lower surface of said floor part and thus act as a stop to limit the closing movement of the throttle-lever so that the throttle will not be entirely closed and the engine or motor will continue to run slowly, but at a speed below that at which the centrifugally operated clutch will be thrown into clutching engagement to transmit the power of the engine or motor to the driving mechanism of the vehicle. Another arm 25 of the lever 20 is connected by a rod 26 with the lever 27 of the carbureter throttling-valve, the carbureter shown being of that type shown in our Patent No. 747,264, dated December 15, 1903, although any carbureter having a lever-operated throttle may be used.

It will be seen that movement of the rod 26 will actuate the throttle-valve lever 27 so as to control the output of the fuel from the carbureter and will thus regulate the speed of the engine, the carbureter being connected with the engine-cylinders by means of the usual induction pipe 28; suitable fuel-supplying apparatus being provided for delivering fuel to the carbureter. The extreme end of the said rod 26 engages a cut-out switch 29 (see Fig. 3) for controlling the sparking circuit, the circuit being normally through the switch-lever contact point 30 to the governor-controlled lever 31 which is controlled by a centrifugal governor 32, whence it follows its usual course through the sparking instrumentalities. It will be apparent that so long as the switch-lever 29 is in the position shown in full lines in Fig. 3, with the circuit following its normal course through the governor switch, the engine will run at a speed determined by the centrifugal governor 32 in the usual manner. Upon depression of the push-pin 19, the cut-out switch 29 will, through the lever arm 25, the rod 26 and spring 26ª, be thrown to the position shown in Fig. 3 (dotted lines) breaking the contact at 30, closing it at 30ª, and cutting out the automatic governor from the sparking circuit. Under these conditions the speed of the engine is under the immediate control of the operator and may be increased by further depressing the push button.

It will be seen from the foregoing that a single device (push-pin 19), under the immediate control of the operator, is utilized to take care of both the fuel supplied to the engine by the carbureter, by opening or closing the throttling valve as described, and the sparking instrumentalities by cutting out the automatic governor and rotating the commutator to effect the spark-advance; and when used in connection with the clutch device of our Patent No. 766,551, above referred to, or any other automatically operated clutch mechanism, the starting of the car is easily and smoothly effected by the control mechanism above described. For example, if the automatic governor 32 be set to limit the engine to say 200 revolutions per minute as the maximum, the car at this low engine speed will be standing idle owing to the fact that the clutch devices and power-transmitting mechanism will not operate at this rate of speed. Depression of the push-pin 19, however, will open the throttle of the carbureter, increasing the fuel supplied to the engine, cut out the centrifugal governor 32 so that the sparking circuit will be under the immediate control of the operator, and rotate the commutator to secure the necessary spark advance. The effect of this is to speed the engine up to the point where the clutch devices will engage, the power-transmission be set in motion, and the car started. Where the clutch device is of the high and low-speed type illustrated by our Patent No. 766,551, hereinbefore referred to, it is apparent that the low-speed clutch will first operate, and upon a higher speed of the engine being attained, due to the further depression of the push-pin 19 and actuation of its control mechanisms, the high-speed clutch will be thrown into operation and a maximum speed attained.

The operation will perhaps be better understood by reference to Fig. 4 of the drawings, in connection with Fig. 1. The flywheel 45, which is rigidly connected with the motor or engine shaft 46 so as to rotate therewith, is formed hollow for the reception of the automatic centrifugal clutch-device which is preferably employed to connect the said fly-wheel with the driven or power-transmitting shaft 47. In the construction herein shown a ring 48 is secured to the interior of the fly-wheel 45 and is provided with a central, inwardly projecting web or flange 49. Pivoted to suitable lugs projecting from the periphery of the ring 48 are a suitable number of centrifugal clutch-controlling devices consisting of two sets of weights 50 and 51 having angular arms or projections 52. Interposed between nuts 53 (on studs 54 attached to the ring 48) and portions of said weights 50 and 51, are springs 55 which serve to hold said weights against the periphery of the said ring until the fly-wheel attains a certain speed of rotation determined by the stress of said springs, and when such stress is overcome by centrifugal action due to rotation of the fly-wheel said weights will be forced outward to effect frictional engagement, by the angular arms 52, between the clutch members to set the power-transmitting shaft 47 in motion.

Keyed or otherwise suitably secured to the shaft 47 is a high-speed hub or clutch-drum 56 engaged with which, to rotate therewith, by means of interlocking notches and projections, are clutch rings or disks 57; and engaged with the ring 48, to rotate therewith, also by interlocking notches or projections, are clutch rings or disks 58, alternating with the clutch-rings or disks 57. Mounted to rotate loosely on the shaft 47 is a low-speed hub or clutch-drum 59, with which are also engaged, to rotate therewith, a series of clutch-rings or disks 60 alternating with clutch rings or disks 61 rotating with the ring 48. The clutch rings or disks 57, 58, 60 and 61 are free to move longitudinally of the shaft 47 for clutching and unclutching operation. The several clutch rings or disks will be forced into frictional clutching engagement with each other and with the web or flange 49 of the ring 48 by the arms 52 of the weights 50 and 51 when the speed of rotation of the clutch-casing or fly-wheel 45 is sufficient to overcome, by centrifugal action, the stress of the spring 55. The high-speed centrifugal weights 50 will be controlled by springs 55 of greater power or stress, or placed under greater tension, than the springs controlling the low-speed centrifugal weights 51, and these springs may be adjusted by means of the nuts 54 to any degree of tension or stress to be overcome by any desired predetermined speed of rotation of the fly-wheel or casing 45 connected with the motor or power-shaft 46.

Keyed or otherwise secured to the shaft 47, to rotate therewith, are gear-wheels 62 and 63. Connected with the clutch drum or hub 59 by a sleeve 64 is a gear-wheel 65, meshing with a larger gear-wheel or gear-ring 66, connected with a shaft 67, mounted in suitable bearings in the gear-case, 33, by a silent ratchet or grip device comprising a wheel 68, keyed to the said shaft and provided at its periphery with tapering recesses as shown in our said clutch patent, for the reception of clutch or grip rollers 69, with which coöperate coil-springs (not herein shown) to assist in the initial grip operation, but which springs will yield when the shaft 67 overruns in speed the gear-wheel 66, and thereby releases the clutch or grip rollers 69 and disengages the said gear-wheel from its grip or silent-ratchet connection, with said shaft, as explained in our said Patent No. 766,551, hereinbefore-mentioned.

Splined to the shaft 67, to rotate therewith, is a gear-wheel 70 meshing with the gear-wheel 62 on the shaft 47, the hub of the said gear-wheel 70 being provided with a smaller gear-wheel 72 adapted to be shifted into engagement with an idler-gear 73 rotating on a stud 74 and meshing with the gear 63 keyed to the power-transmitting shaft 47. The annularly-grooved hub of the gear 72 is engaged by a pin or pins on a shifting arm or lever 34, and by which the gears 70 and 72 may be shifted lengthwise of the shaft 67 to disengage the gear 70 from the gear 62 and to engage the gear 72 with the gear 73 when the direction of rotation of the power-transmitting shaft 47 is to be reversed.

The operation of the above-described clutch and gearing mechanism is as follows: When the fly-wheel or clutch-casing 45 attains a speed of rotation sufficient to overcome the stress of the springs holding the low-speed centrifugal weights inward, the said weights will be forced outward and the said arms 52 connected therewith will force the low-speed clutching-disks into frictional engagement with each other, and thus, through the clutch-drum or hub 59, sleeve 64, gears 65, 66, and the silent-ratchet or grip device and wheel 68, will set the shaft 67 into rotation; and the latter, through the gears 70 and 72, will transmit movement to the driven or power-transmitting shaft 47. If the speed of rotation of the fly-wheel or clutch-casing 45 be increased to a point sufficient to overcome the stress of the springs 55, controlling the high-speed centrifugal weights 50, said last-named weights will be forced outward and their arms 52 will force the high-speed clutch-disks into frictional engagement with each other, and thus impart movement to the power-transmitting shaft 47 direct through the clutch-drum 56, keyed to said shaft; the gear-wheel 66 then overrunning loosely and idly. If, however, the duty or load on the power-transmitting shaft 47 becomes too great for the power received from the motor or driving-shaft for the high-speed at which the mechanism may be running, or if the power received from the motor or power-shaft be lessened so as to reduce such speed below the point at which the high-speed centrifugal clutch-weights are set to operate, the high-speed clutches will cease to act and the low-speed clutches will immediately come into operation and continue the rotation of the power-transmitting shaft, but at a reduced rate of speed, through the lower gearing connecting the low-speed clutch-disks with the said power-transmitting shaft 47. If at any time the load or duty on the power-transmitting shaft becomes sufficiently heavy or great to throw the low-speed clutches out of action, by reducing the speed of rotation of the fly-wheel and clutch gear casing 45 below the predetermined speed-point for which the low-speed centrifugal clutch-weights may be adjusted, the motor or power-shaft will become entirely disengaged from the power-transmitting shaft 47 and the engine or motor will then run free until it attains a speed sufficient to again engage the low-speed clutch device. It will thus be understood, as the automatic centrifugally controlled clutch and gear changing mechanism is governed by the speed of the motor, which is in turn manually controlled by the foot-button or push-pin 19, through the throttle-valve, that the said mechanism is under the control of said foot-button or push-pin, as are also the sparking mechanism, the governor for the latter, and the cut-out switch. The terms "manually controlled" or "manual" as herein employed are intended to refer to a device or part to which the foot or hand of the attendant or driver may be applied to operate or control the same.

The term "automatic", as hereinafter used in the claims of this case in connection with the clutch and change-gear devices or mechanisms, is intended to include power-operated means for automatically setting or releasing the clutch devices and also for changing the speed gears, so that merely by the manipulation of a single controlling device, as a lever or push-button, the clutch mechanism or clutching parts will be automatically engaged by power to set the driving shaft into operation; and when the vehicle is running the changes from low-speed to high-speed, and vice versa, will be effected by power or according to the speed of the motor or engine, without requiring any manually exerted power to set or release the clutch-devices or to change the speed gears, these operations being effected by power or automatically.

The reversing gear, which is mounted within the gear-box 33, is controlled by means of a lever 34 connected with a thrust rod 35 joined to the foot lever 36, pivoted on the inclined pedal board; while the braking mechanism, parts of which appear herein, but to which no claim is made in the present case, is controlled by a second pedal lever 37, shown in dotted lines in Fig. 1. It will thus appear that the entire control of the car, and all its mechanisms, is reduced to three controlling devices, in addition, of course, to the usual steering gear (not shown).

The muffler, as herein shown, comprises a muffler-casing 38, which may be of any approved or suitable construction, said muffler casing having a header 39 secured at one end, which header receives a plurality of cooling pipes or tubes 40. At their outer ends said pipes enter a second header 41 which receives the exhaust pipe from the engine cylinders. By this arrangement it will be seen that the exhaust gases must pass through the cooling tubes 40 before entering the muffler 38, and the result is that the cooled and spent gases issue from the muffler 38 with less noise. Furthermore by cooling the exhaust product their volume is reduced and the back pressure to the engine cylinders considerably diminished.

In order that the engine parts and power-transmitting mechanism may be readily accessible from above, we preferably form the car floor in the manner shown in Fig. 1, in which, as will be seen, a movable section 42 is provided which slides upon the chassis or frame within a recess 43 between the stationary floor 44 of the car and the chassis or framing, thereby providing a readily displaced section which will give convenient access to the motor parts assembled beneath it.

It will be apparent that the construction shown and described is capable of considerable variation within the skill of the mechanic without departing from the spirit of our invention; and we do not, therefore, limit ourselves to the details of construction shown and described, except so far as we are limited by the terms of the appended claims.

Having thus described our invention we claim and desire to secure by Letters Patent:

1. In a motor vehicle, the combination of a motor, fuel-supplying apparatus therefor comprising a throttle, an automatic clutch device between the motor and a driven part, a single device for controlling the said throttle and the operation of the automatic clutch device, and a stop for limiting the closing movement of the throttle so that the motor may continue to run but at a speed too low to permit clutching engagement of the said automatic clutch.

2. In a motor vehicle, the combination of a motor, fuel-supplying apparatus therefor comprising a throttle, a sparking device, an automatic clutch device between the motor and a driven part, a single device for controlling the said throttle, the sparking device and the operation of the automatic clutch device, and a stop for limiting the closing movement of the throttle so that the motor may continue to run but at a speed too low to permit clutching engagement of the said automatic clutch.

3. In a motor vehicle, the combination with a motor for driving the same, of means for supplying power to the said motor, an automatic clutch device and gear-changing mechanism through which the motor may be connected to a driven part, to drive the vehicle at different speeds, a single device or push-pin for controlling the motor speed, the operation of the automatic clutch device and the vehicle speed, and a stop for limiting the movement of the said controlling device when power is to be reduced, so that said motor may continue to run but at a speed too low to permit clutching engagement of said automatic clutch.

4. In a motor-vehicle, the combination with a motor, of a fuel-supplying apparatus therefor comprising a throttle, an automatic clutch device and gearing between the said motor and a driven part, to drive the vehicle at different speeds, a single device or push-pin for controlling said throttle and thereby regulating the motor-speed, the operation of the said automatic clutch and the vehicle speed, and a stop for limiting the closing movement of said throttle so that said motor may continue to run but at a speed too low to permit clutching engagement of said automatic clutch.

5. In a motor-vehicle, the combination with a motor, of a fuel-supplying apparatus therefor comprising a throttle, an automatic clutch, gearing and gear-changing mechanism between the said motor and a driven part, to drive the vehicle at different speeds, a single device or push-pin for controlling said throttle and thereby regulating the motor speed, the operation of the said automatic clutch, and also controlling the vehicle speed through the said gear-changing mechanism, and a stop for limiting the closing movement of said throttle, so that said motor may continue to run but at a speed too low to permit clutching engagement of said automatic clutch.

6. In a motor-vehicle, the combination with a motor, of a fuel-supplying apparatus therefor comprising a throttle, a sparking device, an automatic clutch, gearing and gear-changing mechanism between the said motor and a driven part, a single device or push-pin for controlling said throttle and sparking device and thereby regulating the operation of the said automatic clutch, and also controlling the vehicle speed through the said gear-changing mechanism, and a stop for limiting the closing movement of said throttle so that said motor may continue to run but at a speed too low to permit clutching engagement of said automatic clutch.

7. In a motor vehicle, the combination of a motor, fuel-supplying apparatus therefor comprising a throttle, an automatically engaged and disengaged clutch device between the motor and a driven part, a single device for controlling said fuel-supplying throttle device and the operation of the automatic clutch device, and means whereby the fuel supplied to the motor may be limited so as to keep the motor running but at a speed too low to cause automatic clutch engagement.

8. In a motor vehicle, the combination of a motor, fuel-supplying apparatus therefor comprising a throttle, an automatically engaged and disengaged clutch device between the motor and the driven part, a single device for controlling the said throttle and the operation of the automatic clutch device, and means for preventing the motor from stopping when the speed of the said motor has been reduced by said controlling device to a point too low to cause automatic clutch engagement.

In testimony whereof we affix our signatures, in presence of two witnesses.

THOMAS LEGGETT STURTEVANT
THOMAS JOSEPH STURTEVANT.

Witnesses:
W. KELLES,
L. H. STURTEVANT.